(12) United States Patent
Tsuchiya et al.

(10) Patent No.: US 9,491,096 B2
(45) Date of Patent: Nov. 8, 2016

(54) NETWORK APPARATUS, CONTROL METHOD THEREOF, CONTROL PROGRAM AND PACKET NETWORK SYSTEM

(75) Inventors: Koichi Tsuchiya, Tokyo (JP); Yutaka Takekoshi, Tokyo (JP)

(73) Assignees: NEC CORPORATION, Tokyo (JP); NEC ENGINEERING LTD., Tokyo (JP)

(*) Notice: Subject to any disclaimer, the term of this patent is extended or adjusted under 35 U.S.C. 154(b) by 941 days.

(21) Appl. No.: 13/433,528

(22) Filed: Mar. 29, 2012

(65) Prior Publication Data

US 2012/0250680 A1 Oct. 4, 2012

(30) Foreign Application Priority Data

Mar. 30, 2011 (JP) .................... 2011-074086

(51) Int. Cl.
*H04L 12/741* (2013.01)
*H04L 12/743* (2013.01)

(52) U.S. Cl.
CPC ........... *H04L 45/54* (2013.01); *H04L 45/7457* (2013.01)

(58) Field of Classification Search
CPC ....... H04L 45/00; H04L 45/16; H04L 45/52; H04L 45/742; H04L 45/54; H04L 45/47
See application file for complete search history.

(56) References Cited

U.S. PATENT DOCUMENTS

| 6,950,367 | B2 | 9/2005 | Kaneko |
| 7,110,450 | B1 | 9/2006 | Kimoto |
| 7,924,833 | B2 | 4/2011 | Kanetake et al. |
| 2005/0147111 | A1* | 7/2005 | Moleyar et al. ............... 370/412 |
| 2008/0101396 | A1* | 5/2008 | Miyata .................... H04L 12/66 370/408 |
| 2010/0250857 | A1* | 9/2010 | Matsui .......................... 711/133 |

FOREIGN PATENT DOCUMENTS

| JP | 1166845 | 3/1999 |
| JP | 2000201354 | 7/2000 |
| JP | 2003282823 | 10/2003 |
| JP | 2005117171 | 4/2005 |
| JP | 2009-216400 | 9/2009 |

OTHER PUBLICATIONS

Japanese Office Action, dated Nov. 11, 2014, in corresponding Japanese Patent Application No. 2011-074086.

* cited by examiner

*Primary Examiner* — Ian N Moore
*Assistant Examiner* — Brian T Le
(74) *Attorney, Agent, or Firm* — Young & Thompson (57) ABSTRACT

A switching process includes an SRAM/CAM storing registration data including a forwarding database used for packet-forwarding and a DRAM storing packet data. The registration data including the forwarding database of the SRAM/CAM for packet-forwarding is stored into the DRAM as a copy of the registration data, and the registration data of the DRAM is used to refresh the registration data of the SRAM/CAM for a predetermined time interval. A data error in the SRAM/CAM caused by a soft-error is rewritten to normal data by periodical refreshing so that data is guaranteed with relatively low cost and the reliability of the network apparatus is improved.

9 Claims, 6 Drawing Sheets

FORWARDING DATABASE (FDB)
USED FOR PACKET-FORWARDING,
IP ADDRESS, L4 PORT,
OUTPUT INTERFACE INFORMATION

| KIND OF DATA | IMPORTANCE | AREA INFORMATION | REFRESH CYCLE |
|---|---|---|---|
| A | HIGH | Address A1 ~Address A2 | T1 |
| B | LOW | Address B1 ~Address B2 | T2 |
| C | LOW | Address C1 ~Address C2 | T3 |
| ... | ... | ... | ... |

NETWORK APPARATUS, CONTROL METHOD THEREOF, CONTROL PROGRAM AND PACKET NETWORK SYSTEM

CROSS REFERENCE TO RELATED APPLICATIONS

Priority is claimed on Japanese Patent Application No. 2011-074086, filed Mar. 30, 2011, the content of which is incorporated herein by reference.

BACKGROUND OF THE INVENTION

1. Field of the Invention

The present invention relates to a network apparatus, a control method for the network apparatus, a control program, and a packet network system.

2. Description of Related Art

A network apparatus such as a switching processer or the like, generally uses both a DRAM (Dynamic Random Access Memory) storing packet data and an SRAM (Static Random Access Memory)/CAM (Content Addressable Memory) storing a forwarding database (FDB) used for packet-forwarding.

In such a network apparatus that shares the FDB with multiple processers used for forwarding packets, when an data error is detected, rewriting of data is performed by another processor which is different from the processor that is used for forwarding packets. Thereby, when a memory error occurs in the network apparatus, data recovery cannot be performed by individual processors in the switching processer.

In semiconductor memories, there is a problem called a soft-error in which specific radiation generates noise in the semiconductor and inverts the state of the memory. Once abnormal data is generated in the network apparatus which includes a DRAM storing packet data and an SRAM/CAM storing data, the network apparatus does not correctly perform data-forwarding, and which affects the network.

As a solution for a soft-error, a specific material is used in a device for improving the tolerance for soft-errors, or an error correction circuit is added to the memory circuit as a peripheral circuit of the memory.

For example, Japanese Unexamined Patent Application, First Publication No. 2009-216400 (patent document 1) describes an error correction code creation circuit that creates an error correction code for entry data written in a CAM and error detection and correction circuits used for detecting and correcting a data error based on the error correction code with respect to data read from the CAM. Thus, the error detection and correction circuits perform detection and correction of errors based on the error correction code with respect to the read-out data from the CAM.

As described above, the network is affected if abnormal data is generated in the data stored in the SRAM/CAM of the network apparatus that uses both the DRAM storing packet data and the SRAM/CAM storing the forwarding database for packet-forwarding. For this issue, as described in patent document 1, an error correction process can be performed by adding an error correction code to the data stored in the SRAM/CAM.

However, it is difficult for the SRAM/CAM to correct an error by adding an error code because the operation speed of SRAM/CAM is fast and the bit cost is high compared to those of the DRAM.

SUMMARY OF THE INVENTION

In consideration of the problem described above, an exemplary object of the present invention is to provide a network apparatus, a control method for the network apparatus, a control program, and a packet network system which avoid loosing information in an SRAM/CAM storing the forwarding database used for packet-forwarding due to a soft-error.

A network apparatus in accordance with an exemplary aspect of the present invention includes a first storage unit configured to store registration data including a forwarding database used for packet-forwarding, a second storage unit configured to store packet data, and a refreshing unit configured to store the registration data into the first storage unit and the second storage unit, and refresh the first storage unit based on the registration data stored in the second storage unit.

In accordance with an exemplary aspect of the present invention, a control method for a network apparatus that has a first storage unit for storing registration data including a forwarding database used for packet-forwarding and a second storage unit storing packet data includes storing the registration data into the first storage unit and the second storage unit, and refreshing the registration data of the first storage unit based on the registration data stored in the second storage unit.

In accordance with an exemplary aspect of the present invention, a computer-readable recoding medium recording a program that is executable by the computer for controlling a network apparatus that has a first storage unit for storing registration data including a forwarding database used for packet-forwarding and a second storage unit storing packet data, when being executed, the computer makes the network apparatus perform storing the registration data into the first storage unit and the second storage unit, and refreshing the registration data of the first storage unit based on the registration data stored in the second storage unit.

A packet network system in accordance with an exemplary aspect of the present invention, which forwards packet data based on a forwarding database, is constructed of a network apparatus, the network apparatus includes a first storage unit configured to store registration data including a forwarding database used for packet-forwarding, a second storage unit configured to store packet data, and a refreshing unit configured to store the registration data into the first storage unit and the second storage unit, and refresh the first storage unit based on the registration data stored in the second storage unit.

For a network apparatus in accordance the exemplary aspect of with the present invention, registration data (R-DATA) received from a CPU is written at the same time to an SRAM/CAM for registration and a DRAM as a copy of data. At a predetermined time interval, divided registration data is read out from a predetermined registration data area of the DRAM. The read divided registration data is written over the SRAM/CAM for refreshing, so that it is possible to avoid losing the forwarding database of the SRAM/CAM due to a soft-error.

DETAILED DESCRIPTION OF THE INVENTION

Figure 1:
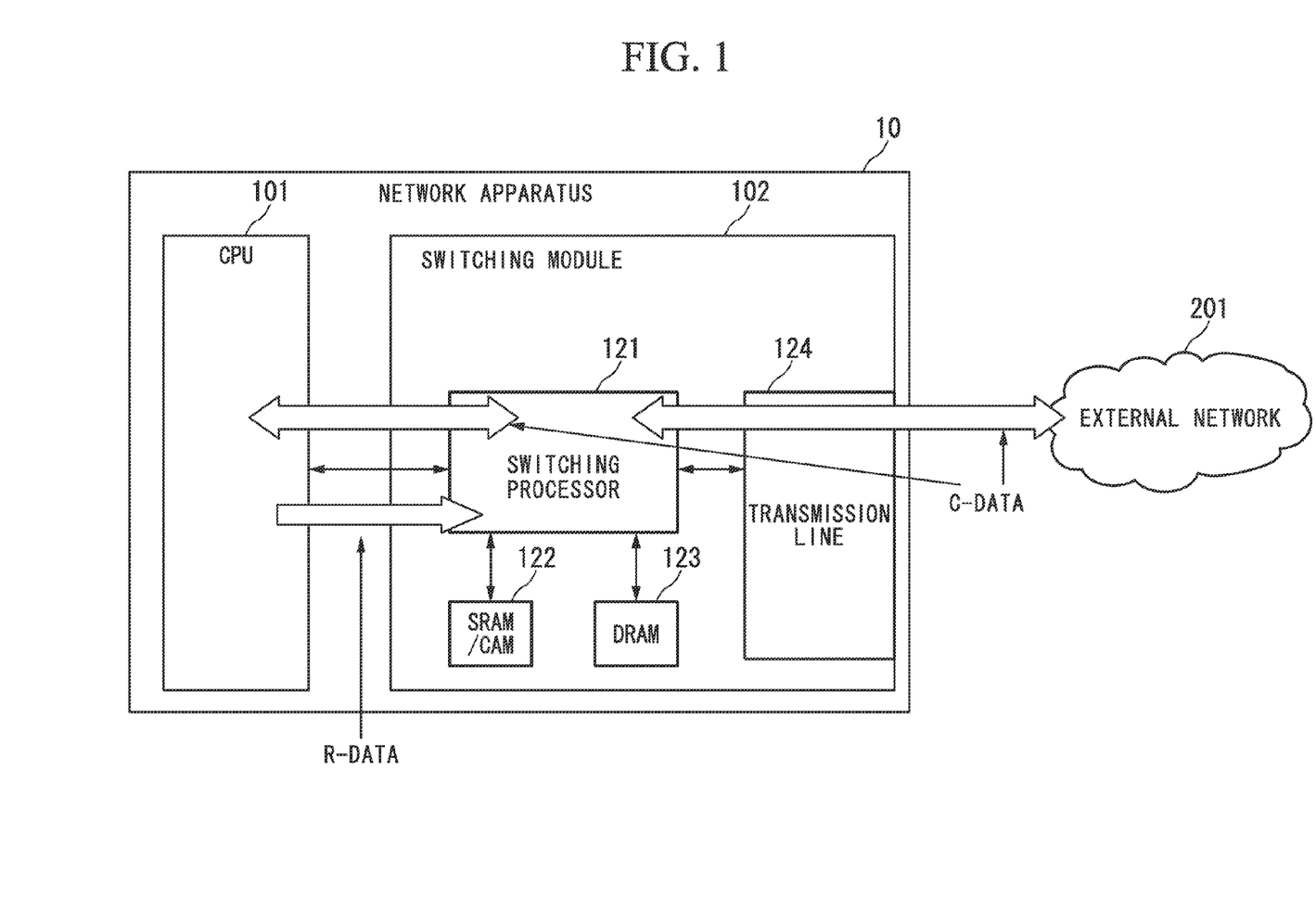
FIG. 1 is a block diagram that illustrates a network apparatus in accordance with a first embodiment of the present invention.

Hereafter, embodiments in accordance with the present invention will be described with reference to drawings. FIG. 1 is a block diagram that illustrates a network apparatus 10 in accordance with a first embodiment of the present invention.

As shown in FIG. 1, the network apparatus 10 according to the embodiment of the present invention includes a CPU 101 and a switching module 102. The switching module 102 includes a switching processor 121 that is capable of communicating with the CPU 101, and an SRAM/CAM 122 and a DRAM 123 are connected to the switching processor 121 as storage parts of the switching processor 121. The SRAM/CAM 122 stores registration data including a forwarding database (FDB) used for packet-forwarding. The DRAM 123 is used to store packet data. In addition, in the network apparatus 10 with respect to the embodiment of the present invention, the DRAM 123 is used to refresh the registration data stored in the SRAM/CAM 122 at a predetermined time interval.

The CPU 101 and the switching processor 121 transmit and receive communication data (C-DATA) from an external network 201 via a transmission line 124. In addition, the CPU 101 and the switching processer 121 are configured to transmit and receive registration data that includes setting information, FDB or the like.

Accordingly, with respect to the first embodiment of the present invention, the switching module 102 includes the SRAM/CAM 122 that stores the FDB of packet-forwarding and the DRAM 123 that stores the packet data. A copy of the registration data including an FDB for packet-forwarding is stored in the DRAM 123. The registration data of the DRAM 123 is overwritten to the SRAM/CAM 122, so that the registration data of the SRAM/CAM 122 is refreshed by the normal registration data. The SRAM/CAM 122 is refreshed at the predetermined time interval. In this manner, it is possible for the SRAM/CAM 122 to prevent the FDB from being lost due to a soft-error of the registration data.

Figure 2:
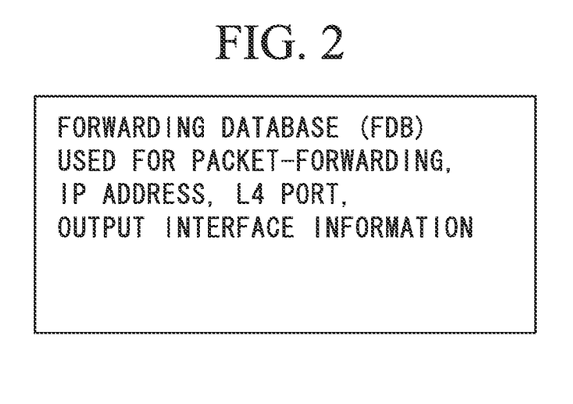
FIG. 2 is a drawing that illustrates an example of registration data in accordance with the first embodiment of the present invention.

FIG. 2 is a drawing that illustrates an example of registration data in accordance with the first embodiment of the present invention. As shown in FIG. 2, a forwarding database (FDB) for packet-forwarding, an IP address, an L4 port (fourth layer: transport layer), output interface information and the like are stored as the registration data.

Figure 3:
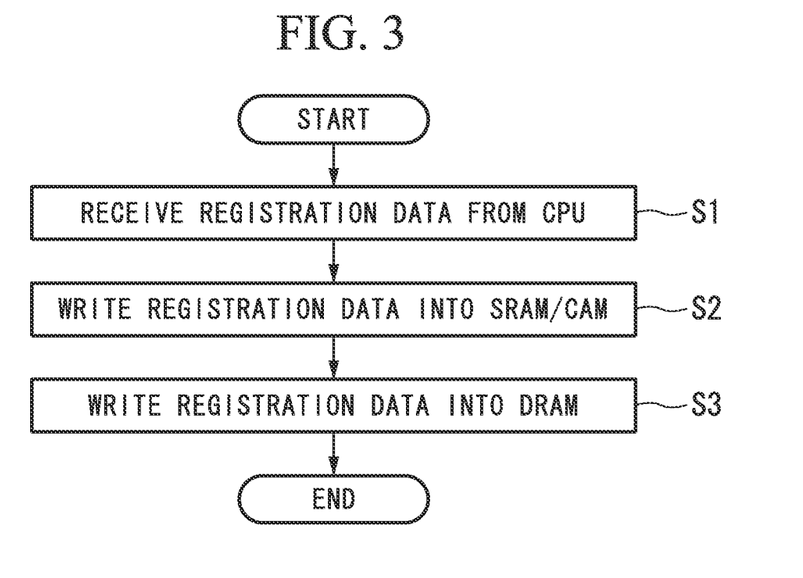
FIG. 3 is a flowchart that illustrates a registration operation of a switching processor in accordance with the first embodiment of the present invention.

FIG. 3 is a flowchart that illustrates a registration operation of the switching processor 121 in accordance with the first embodiment of the present invention. In FIG. 3, when the switching processor 121 receives registration data from the CPU 101 (step S1), the switching processor 121 writes the registration data into the SRAM/CAM 122 (step S2), and at the same time, writes the registration data into the DRAM 123 (step S3). Thus the registration process is completed.

Figure 4:
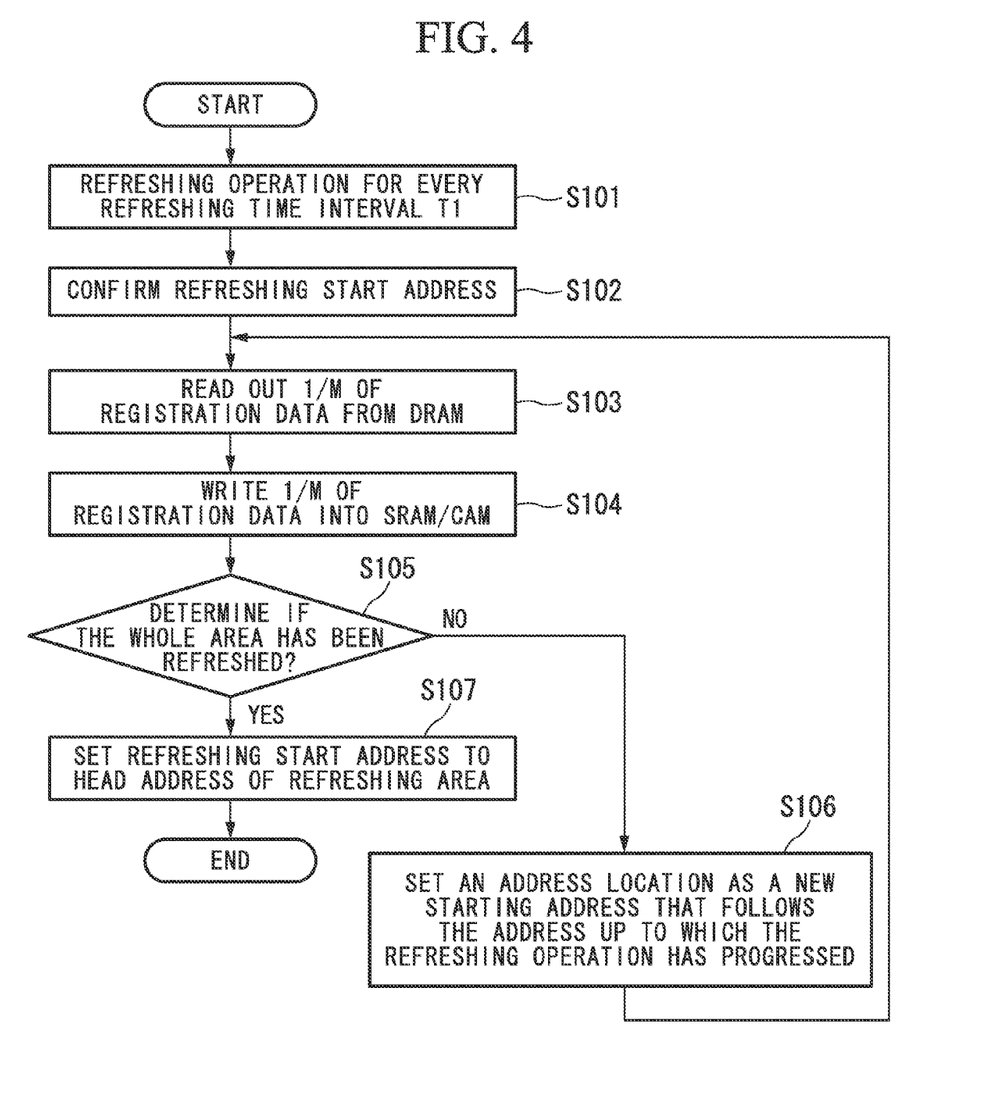
FIG. 4 is a flowchart that illustrates a refreshing operation of the switching processor in accordance with the first embodiment of the present invention.

FIG. 4 is a flowchart that illustrates a refreshing operation of the switching processor 121 in accordance with the first embodiment of the present invention.

In FIG. 4, when a refreshing time interval T1 has passed (step S101), the switching processor 121 confirms a refreshing start address (step S102), reads out a 1/M of the registration data corresponding to the refreshing area of the SRAM/CAM 122 from the DRAM 123 (step S103), and writes the read 1/M of the registration data into the SRAM/CAM 122 (step S104).

Next, the switching processor 121 determines whether or not the refreshing operation has completed over the entire refreshing area (step S105). If the refreshing operation has not completed over the entire area (step S105: No), the switching processor 121 sets an address location as a new starting address that follows the address up to which the refreshing operation has progressed (step S106), and then the switching processor 121 repeats the process from step S103.

In step 105, if the refreshing operation has completed over the entire refreshing area (S105: Yes), the switching processor 121 sets the refreshing start address to the head address of the refreshing area (step S107) and stops processing. At the following refreshing time, the switching processor 121 restarts the process from step S101.

Figure 5:
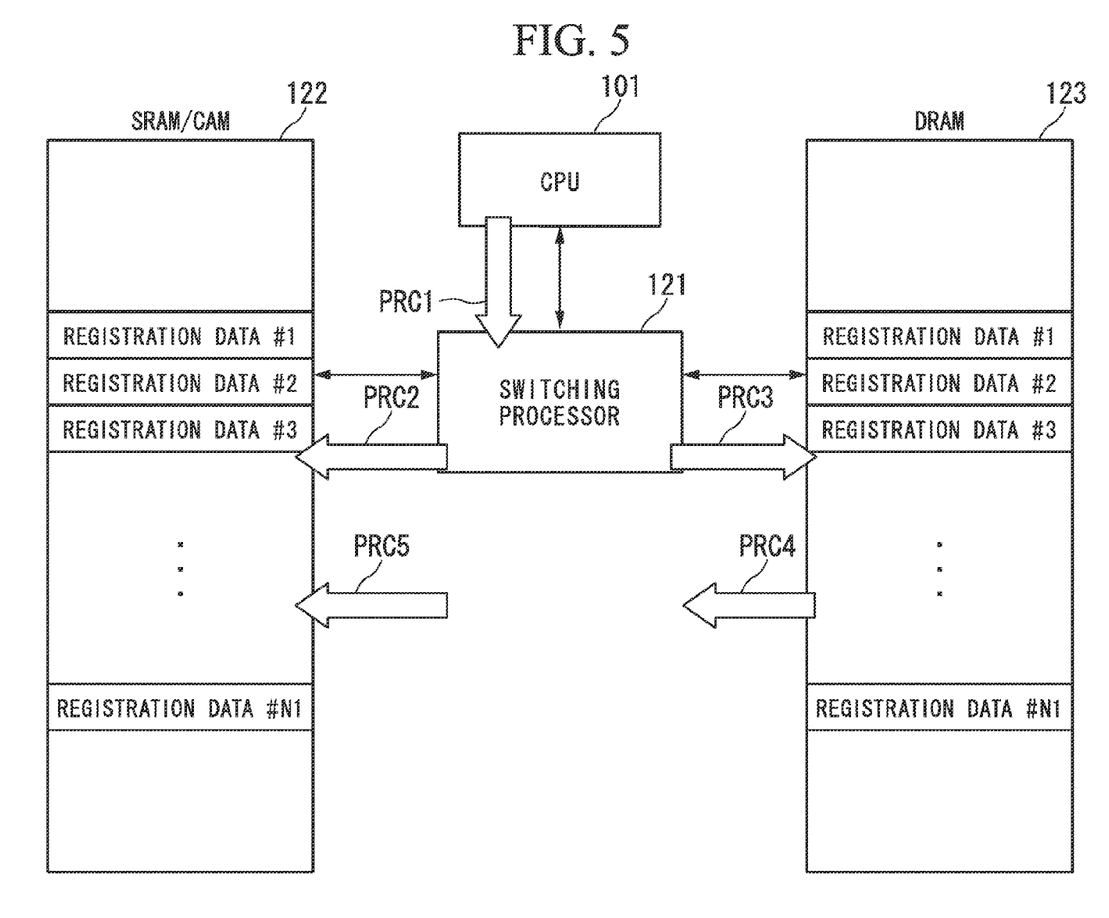
FIG. 5 is a sequence diagram that illustrates operations in accordance with the first embodiment of the present invention.

FIG. 5 is a sequence diagram that illustrates operations in accordance with the first embodiment of the present invention. In FIG. 5, the registration data is sequentially transmitted from the CPU 101 to the switching processor 121 (process PRC1).

The switching processor 121 writes the registration data into the SRAM/CAM 122 (process PRC2), and then writes the registration data into the DRAM 123 as a copy of data (process PRC3) at the same time (process PRC2).

At a refreshing time interval (T1), the switching processor 121 reads a 1/M1 (M1 indicates the number of divided data for overwriting) of the registration data (registration data #1, #2, #3, . . . ) out from the entirety of the registration data (#1-#N1) of the DRAM 123 (process PRC4), and overwrites the read 1/M1 of the registration data to the data area in the SRAM/CAM 122 where the identical data is registered (process PRC5). This process rewrites error data into normal data if a soft-error has occurred.

In this case, the refreshing time interval (T1) and the number of divided data for overwriting (M1) can be changed flexibly to adjust the frequency of overwriting data. As the refreshing time, for example, one second can be used to refresh the entirety of the data.

By decreasing the refreshing time interval (T1) unlimitedly or by making the number of divided data for overwriting (M1) approach 1, the interval of overwriting data gets shortened so that it is possible to quickly rewrite normal data in response to soft-error occurrence, and thus the reliability improves.

When the overwriting of the registration data (N1) has completed, the overwriting of data is performed from the head of the registration data again.

As described above, according to the first embodiment of the present invention, the switching processor 121 periodically refreshes the registered data of the SRAM/CAM 122 received from the CPU 101. Thereby, a data error due to a soft-error caused in the SRAM/CAM 122 is rewritten to normal data by periodically refreshing data so that the data can be guaranteed with relatively low cost. This is effective to improve the reliability of the network apparatus.

Figure 6:
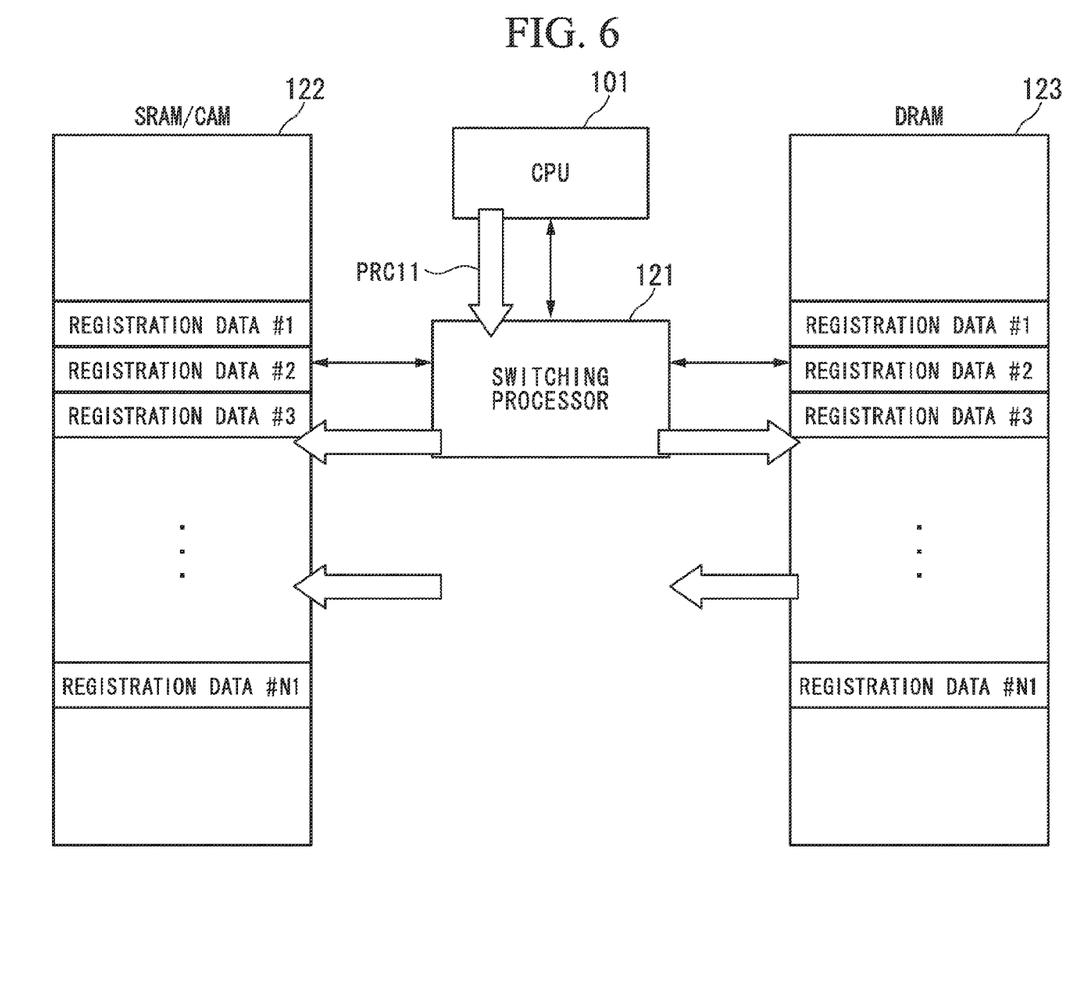
FIG. 6 is a sequence diagram that illustrates operations in accordance with another embodiment of the present invention.

FIG. 6 is a sequence diagram that illustrates operations in accordance with another embodiment of the present invention. In another embodiment shown in the present embodiment, the CPU 101 transmits registration data with an indication of importance to the switching processor 121 (PRC11), and the refreshing time interval is changed based on the importance of the registration data.

Figure 7:
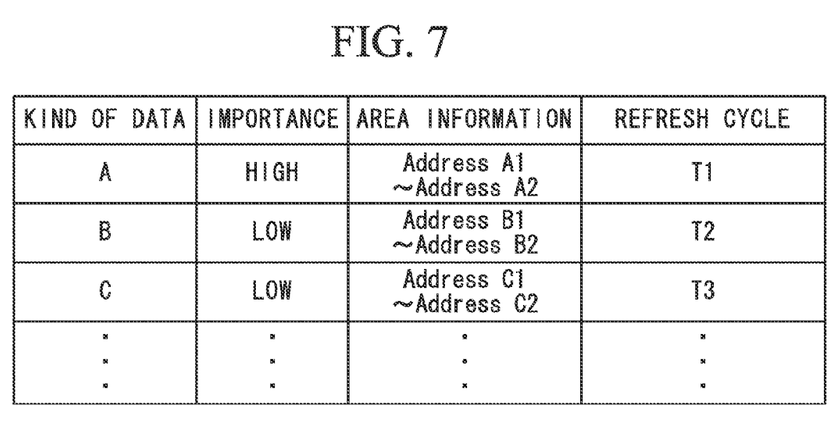
FIG. 7 is a drawing that illustrates a control table in accordance with another embodiment of the present invention.

According to another embodiment of the present invention, a control table shown in FIG. 7 is provided. The control table includes an item indicating the importance of particular registration data. The refreshing time interval is determined in response to the importance. In other words, the refreshing time interval (T1) is determined to be shorter as the importance increases. In this manner, highly important information can be secured with high priority.

In the above example, although the refreshing time interval (T1) is determined in response to the importance, the amount of divided data for overwriting (1/M1) for refreshing data can be changed. Furthermore, according to the importance, both the refreshing time interval (T1) and the amount of divided data for overwriting (1/M1) for refreshing data can be changed.

While preferred embodiments of the invention have been described and illustrated above, it should be understood that these are exemplary of the invention and are not to be considered as limitations. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A network apparatus, comprising:
a first storage unit configured to store registration data including a forwarding database used for packet-forwarding;
a second storage unit configured to store packet data;
a switching processor configured to receive an importance of the registration data from a CPU, the importance of the registration data being related to a priority of the registration data; and
a refreshing unit configured to store the registration data into the first storage unit and the second storage unit, and refresh the first storage unit based on the registration data stored in the second storage unit at a predetermined time interval,
wherein a control table is provided that has stored therein information of the registration data and the importance corresponding to the registration data, and the predetermined time interval is determined to be shorter as the importance of the registration data stored in the control table increases.

2. The network apparatus according to claim 1, wherein the first storage unit corresponds to an SRAM/CAM and the second storage unit corresponds to a DRAM.

3. The network apparatus according to claim 1, wherein the refreshing unit reads out a predetermined divided amount of the registration data stored in the second storage unit at the predetermined time interval and overwrites the predetermined divided amount of the registration data into the first storage unit so that the registration data in the first storage unit is refreshed.

4. The network apparatus according to claim 3, wherein the predetermined divided amount of the registration data is changeable.

5. The network apparatus according to claim 4, wherein the predetermined divided amount of the registration data is changed based on the importance of the registration data.

6. A control method of a network apparatus that has a first storage unit for storing registration data including a forwarding database used for packet-forwarding and a second storage unit storing packet data, the method comprising:
storing the registration data into the first storage unit and the second storage unit;
receiving an importance of the registration data from a CPU by a switching processor, the importance of the registration data being related to a priority of the registration data;
providing a control table that has stored therein information of the registration data and the importance corresponding to the registration data; and
refreshing the registration data of the first storage unit based on the registration data stored in the second storage unit at a predetermined time interval, wherein the predetermined time interval is determined to be shorter as the importance of the registration data stored in the control table increases.

7. A non-transitory computer-readable recording medium having computer instructions recorded thereon for causing a computer device to manage a network apparatus that has a first storage unit that stores registration data including a forwarding database used for packet-forwarding, and a second storage unit that stores packet data, said recorded computer instructions, upon execution by a CPU of the computer device, cause the computer device to make the network apparatus perform the steps of:
storing the registration data into the first storage unit and the second storage unit;
receiving an importance of the registration data from a CPU by a switching processor, the importance of the registration data being related to a priority of the registration data;
providing a control table that has stored therein information of the registration data and the importance corresponding to the registration data; and
refreshing the registration data of the first storage unit based on the registration data stored in the second storage unit at a predetermined time interval, wherein the predetermined time interval is determined to be shorter as the importance of the registration data stored in the control table increases.

8. A packet network system, which forwards packet data in response to a forwarding database used for packet-forwarding, is constructed of a network apparatus, the network apparatus comprising:
a first storage unit configured to store registration data including a forwarding database used for packet-forwarding;
a second storage unit configured to store packet data;
a switching processor configured to receive an importance of the registration data from a CPU, the importance of the registration data being related to a priority of the registration data; and
a refreshing unit configured to store the registration data into the first storage unit and the second storage unit, and refresh the first storage unit based on the registration data stored in the second storage unit at a predetermined time interval, wherein the predetermined time interval is determined to be shorter as the importance of the registration data included in a control table increases.

9. The network apparatus according to claim 1, wherein the control table has stored therein entries of a plurality of registration data, and corresponding information of importance for each of said plurality of registration data.

* * * * *